United States Patent [19]

Le Bars

[11] 4,420,688

[45] Dec. 13, 1983

[54] DEVICE FOR DETECTING INFRARED RADIATION

[75] Inventor: Jean-Francois Le Bars, Paris, France

[73] Assignee: Thomson-CSF, Paris, France

[21] Appl. No.: 285,566

[22] Filed: Jul. 21, 1981

[30] Foreign Application Priority Data

Jul. 22, 1980 [FR] France ................. 80 16126

[51] Int. Cl.³ .................................. G01J 1/00
[52] U.S. Cl. ............................. 250/352; 250/353
[58] Field of Search ............... 250/338, 352, 353

[56] References Cited

U.S. PATENT DOCUMENTS 3,770,958 11/1973 Krakow .
3,875,408 4/1975 Pusch .
4,011,452 3/1977 Meyers ................. 250/352
4,041,314 8/1977 Oppelt ................. 250/352

Primary Examiner—Janice A. Howell
Attorney, Agent, or Firm—Oblon, Fisher, Spivak, McClelland & Maier

[57] ABSTRACT

A detector device for limiting background noise detected by a cooled infrared detector. In order to delimit the angle of view of the detector, the device comprises a reflecting deposit formed externally of the cooling device on one face of a transparent element interposed on the receiving path. The deposit can be located on the outer face of the window of the cooling device within which the detector is mounted on a cold table forming a spherical mirror. The complete assembly is optically combined so as to ensure that the radiation issuing from the detector outside the angle of view is returned to the detector.

15 Claims, 5 Drawing Figures

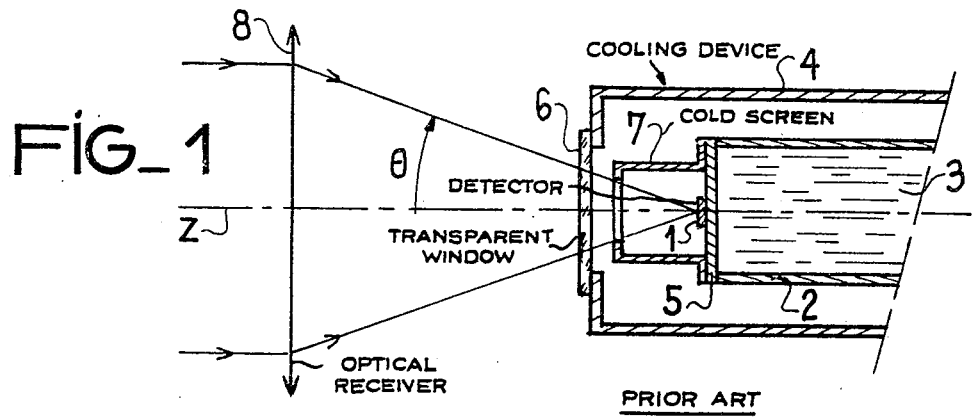
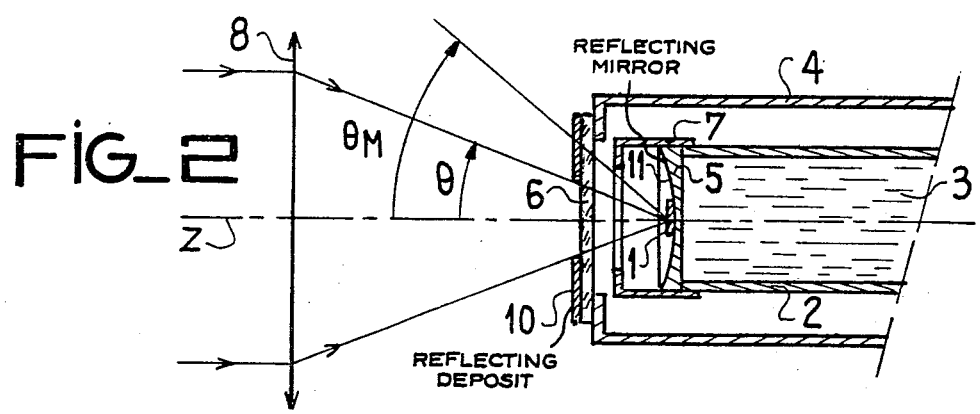
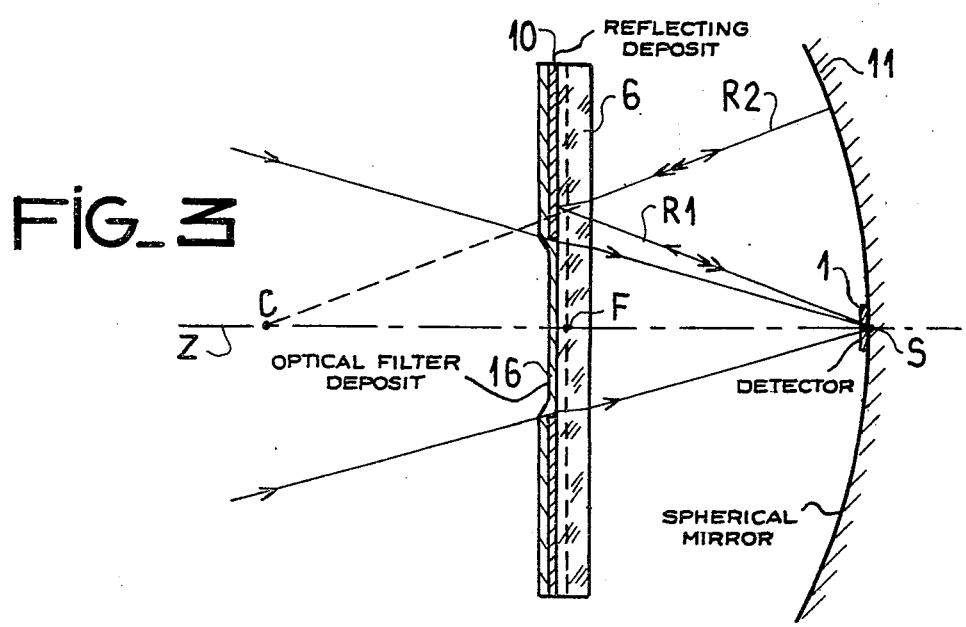

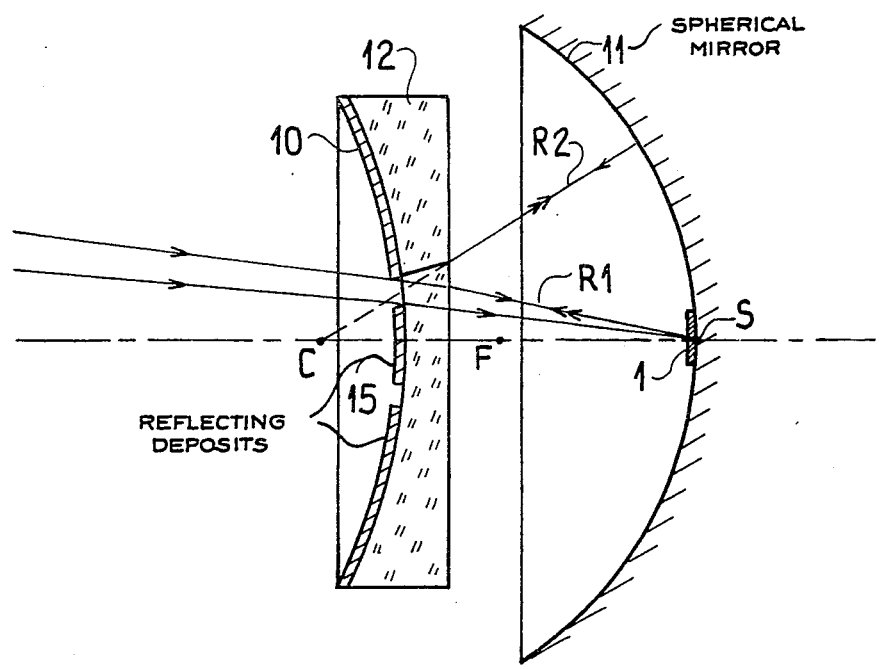
FIG_4
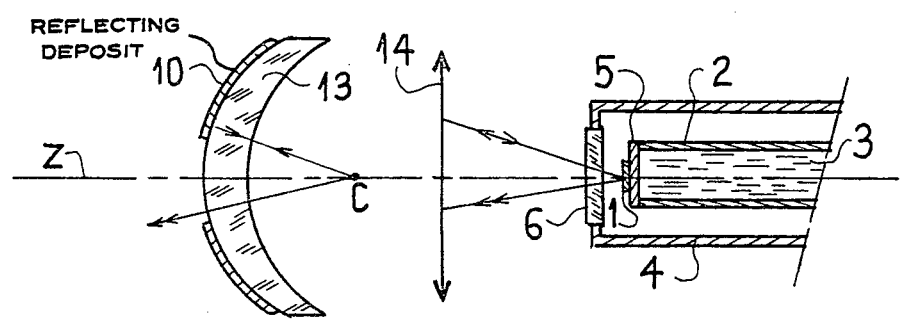
FIG_5

4,420,688

DEVICE FOR DETECTING INFRARED RADIATION

BACKGROUND OF THE INVENTION

This invention relates to devices for detecting infrared radiation (abbreviated to IR) in which the IR detector proper is constituted by one or a number of photoelectric detecting elements, said detector being cooled and supported by a cooling device. The IR detector is adapted to the prescribed spectral operating band and is usually positioned at the focus of a receiving optical system.

In addition to the cooling device, provision must be made for adjustment of the angle of view, or aperture of the detector, to the necessary value in order to limit as far as possible the continuous value of the detected current resulting from the observed background with a view to optimizing the detection signal-to-noise ratio. An optical aperture of the detector which exceeds the useful aperture of the collecting optical system results in an increase in the parasitic background current and consequently in the detected noise.

SUMMARY OF THE INVENTION

In practice, this problem is solved by means of a metallic member rigidly fixed to the inner structure of the cooling device which supports the IR detector. This metallic member or so-called cold screen is provided with a recess forming a diaphragm for fixing the value of optical aperture of the detector. The configuration of the cold screen is therefore a function of the angle of view chosen for the detector, these elements being internal elements of the cooling device which is closed by a transparent window or viewing window.

The result thereby achieved is that the assembly constituted by the cooling device and the detector is designed for a predetermined value of angle of view and thant any subsequent modification of this value would involve a difficult and time-consuming operation.

In order to obviate the difficulties thus mentioned, a known practice consists in employing an annular reflector which surrounds the receiving-radiation focusing lens. The reflector may be spherical and the center of the reflector coincides with the detector. The radiation emitted by the detector outside the angle of view defined by the lens is thus returned by the reflector to the detector. This design does not call for any intervention within the interior of the cooling device in order to limit the angle of view but still does not readily permit adjustment of this angle and entails the need for a large-sized reflector.

The aim of the present invention is to overcome these difficulties by providing a detecting device which readily permits adjustment of the angle of view. The essential advantage of the device lies in the possibility of large-scale production of cooling devices equipped with detectors, in the possibility of subsequent adjustment of the detector without any need to modify the inner structure of the unit and finally in the possibility of accurate setting of the angle of view by means of a simple external operation after encapsulation of the complete assembly and as a function of requirements.

In accordance with one distinctive feature of the invention, the IR detection device comprises a mirror in the form of a reflecting deposit formed on one face of a transparent element which is interposed on the receiving optical path. The deposit is external with respect to the cooling device which contains the detector and can be formed either on the outer face of the viewing window or on one face of an external optical element. The deposit delimits the angle of view by reflecting the receiving radiation which is outside said angle. Furthermore, whether it is employed alone or in conjunction with another optical element, said deposit makes it possible to return to the detector the radiation which issues from this latter externally of the angle of view.

BRIEF DESCRIPTION OF THE DRAWINGS

These and other features of the invention will be more apparent upon consideration of the following description and accompanying drawings, wherein:

FIG. 1 is a diagram recalling a conventional arrangement of a cooled IR detector;

FIG. 2 is a diagram of an IR detection device according to the invention;

FIG. 3 is a diagram relating to the operation of the device illustrated in FIG. 2;

FIG. 4 is a partial diagram of an alternative embodiment of the device illustrated in FIG. 2;

FIG. 5 is a diagram of another alternative embodiment of the IR detection device according to the invention.

DETAILED DESCRIPTION OF THE PREFERRED EMBODIMENTS

In FIG. 1, there is shown a detector 1 mounted within the interior of a cooling device of the Dewar flask type. This device comprises an inner structure 2 containing a cooling liquid 3 usually consisting of liquid nitrogen, and an outer structure 4. A vacuum is created between the two structures. The detector is rigidly fixed to a metallic supporting member or so-called cold table 5 which forms one end of the inner structure. The transparent window 6 terminates a corresponding end of the outer structure and permits transmission of light while maintaining fluid-tightness. The cold screen 7 is rigidly fixed to the inner structure and delimits the angle of view O about the optical axis Z of an associated receiving objective 8, said objective being intended to focus the IR radiation on the detector 1 which is centered in the corresponding focal plane.

The arrangements provided in this known structure comprise a mirror in the form of a reflecting deposit formed on one face of an optical element which is interposed on the receiving optical path and located externally of the cooling device for reasons of convenience. Said deposit is intended to produce action either alone or in conjunction with another optical element for performing two functions. Thus a first function consists in delimiting the angle of view of the detector with precision by reflecting the radiation which emerges from the objective 8 externally of said angle. A second function consists in returning to the detector the IR radiation which is emitted by this latter outside the useful aperture defined by the deposit.

FIG. 2 illustrates an embodiment in which the reflecting deposit 10 is formed on the outer face of the window 6 consisting of a plate having parallel faces. Furthermore, the cold table which supports the detector 1 is machined on the face located nearest the detector in such a manner as to form a mirror 11 having a substantially circular cross-section and adapted to cooperate with the deposit 10 as shown in FIG. 3. Let us consider, for example, the mirror 11 of spherical shape having a center C on the axis Z and the detector 1 placed at the vertex S. The window 6 is positioned substantially with a view to ensuring that the image of its outer face looking from the detector side of the window passes through the focal point F located at an equal distance from the center C and the vertex S. This results from the refraction effect which is a function of the index and of the thickness of the plate 6. This effect is compensated by a relative displacement of the outer face which carries the reflecting deposit, with respect to the focal plane (shown as a chain-dotted line) which passes through the focal point F. Under these conditions, a ray R1 issuing from the detector and located outside the useful field is refracted by the plate and reflected by the plane mirror 10 so as to form a ray R2 which passes through the center C of the spherical mirror. In consequence, said ray R2 strikes the mirror 11 at a normal angle of incidence, is reflected back on its own path and finally arrives at the detector on the same path. By reason of the fact that the mirror 11 forms part of the metallic table 5 and is brought to a very low temperature and the fact that the detector itself is a cold body, a substantial limitation of the background noise is consequently achieved as a result of the foregoing arrangement. In order to limit the dimensions of the mirror 11 and to prevent operation at a point which is too close to the window 6, the cold screen 7 is preferably retained as shown in FIG. 2. However, there is formed in said screen a diaphragm which limits the angle of view to very large apertures and at least to the maximum value $\theta M$ of the angle of view which may be contemplated for the detector 1 under extreme operating conditions. Thus the unit consisting of cooling device and IR detector may conveniently be manufactured in large-scale production and subsequently adjusted to the desired angle $\theta$ in each particular case.

FIG. 4 shows another embodiment in which the reflecting deposit 10 is formed on a concave face of an optical element 12 forming a planoconcave lens, the second face on the detector side being plane. The element 12 may constitute either the window itself or an external element. In the same manner as before, the element 12 together with its mirror 10 must be combined optically with the spherical mirror 11 and will accordingly be located between the center C and the focal point F.

The reflecting deposit 10 may also be formed on a curved face of an external optical element 13 as shown by way of example in FIG. 5. The element 13 is a convergent meniscus associated with one or a number of refracting lenses designated by the reference numeral 14 and the assembly can form part of the collecting optical system 8. In this embodiment, there is no need for any special machining of the table 5 which may remain plane and the cold screen serves no further purpose. This results in substantial simplification of the cooling device. The optical system 13-14 serves to produce the necessary coordination between the detector 1 and the spherical mirror 10 in order to form the image of the detector at the point C which is the center of curvature of the metallic face. In this configuration, the IR radiation emitted by the detector outside the useful angle of view of the collecting optical system returns to the detector, thus limiting the value of the continuous background current to the desired value. In an extreme case, the optical system 13-14 may be replaced by the window 6, the outer face of which is machined so as to be convex and which carries the metallized deposit 10, the detector 1 being located substantially at the center of curvature of the mirror.

In some applications and especially in order to construct homing guidance systems, the receiving objective 8 is of a central occultation type such as a Cassegrain assembly. In accordance with the invention, the occultation zone projected at the level of the face which supports the reflecting deposit 10 is employed for the purpose of forming thereon a complementary reflecting deposit 15 (shown in the example of FIG. 4) which performs a further contributory role in limiting the continuous background.

It is apparent from the foregoing description that the IR detection device according to the invention permits numerous alternative embodiments in accordance with the characteristics which have been explained. The mirror 11 can be of cylindrical or spherical shape and associated with a plane reflecting deposit (as shown in FIG. 2). The deposit 10 may also be contemplated on the face of the window 6 but this calls for disassembly and reassembly of this component. Furthermore, no particulars have been given in regard to the construction of optical filters which may be obtained in different ways in accordance with known techniques. By way of example and with reference to FIG. 3, optical spectral filtering can be carried out either by making a suitable choice of material which constitutes the window 6 or by making a choice of material or materials for the formation of the reflecting deposit 10 which may consist of one or a number of reflecting layers in different spectral bands, or by deposition of filtering materials in one or a number of layers such as the deposit 16 shown in the figure and extended over the metallized portions 10 (this deposit may be formed on the other face). Similarly, no particulars have been given in regard to the geometry of the central zone formed by the deposit 10 and of the diaphragm of the cold screen 7 whose shape may be circular, rectangular or the like, especially as a function of the geometry of the photoreceiving surface of the IR detector.

What is claimed is:

1. A device for detection of infrared radiation comprising:
    a detector having at least one photo detector element for detecting the infrared radiation which arrives at the detector along a receiving optical path;
    a cooling device within which the detector is supported by a metallic cold table and downstream of a transparent window which insures fluid-tightness while allowing the received radiation to pass to the detector; and
    reflecting means whereby the angle of view of the detector is limited and the radiation emitted by the detector externally of the desired angle of view is reflected back to said detector, said means being constituted by a mirror formed by a reflecting deposit on one face of a transparent element interposed on the optical path of reception of said infrared radiation, said reflecting deposit preventing by reflection the reception of radiation located externally of the angle of view, and being formed externally of the cooling device and at least at the level of the outer face of the window.

2. A device according to claim 1, wherein the cold table is machined on the side nearest the detector so as to form a reflecting mirror having a substantially circular cross-section and combined optically with the element which carries the reflecting deposit so that the radiation issuing from the detector externally of the angle of view is reflected from the reflecting deposit towards said mirror to arrive thereon at a normal angle of incidence.

3. A device according to claim 2 in which the cooling device comprises a metallic cold screen which is rigidly fixed to the cold table and provided with an opening forming a diaphragm for transmission of the radiation received through the window, wherein the dimensions of the opening are so determined as to be at least equal to those required for the maximum angle of view to be contemplated for the associated detector.

4. A device according to claim 2, wherein the reflecting deposit is formed on the outer face of the window constituted by a plate having parallel faces located substantially at the focus of the mirror considered on the optical axis of the device which passes through the center of the detector.

5. A device according to claim 2, wherein the reflecting deposit is formed on the concave outer face of the window constituted by a planoconcave lens located between the center and the focus of the mirror, these points being considered on the optical axis of the device which passes through the center of curvature.

6. A device according to claim 1, wherein the reflecting deposit is formed on a convex face of an optical formula located externally of the cooling device, said optical formula being determined to provide the image of the detector formed in the plane of said detector.

7. A device according to claim 6, wherein the optical formula is reduced to the window whose outer face is machined so as to be convex and carries the reflecting deposit, the detector being substantially placed at the corresponding center of curvature.

8. A device according to anyone of claims 2, 3 or 6, and employed in conjunction with an objective which receives the infrared radiation emanating from the observed field and which focuses said radiation onto the detector, wherein the receiving objective is of a central occultation type and wherein the reflecting deposit comprises a complementary reflecting deposit formed within the angle of view and limited to the occultation zone at the level of the face which supports said reflecting deposit.

9. A device for detection of infrared radiation comprising:
  a detector having at least one photodetector element for detecting the infrared radiation which arrives at the detector along a receiving optical path;
  a cooling device within which the detector is supported by a metallic cold table and downstream of a transparent window which ensures fluid-tightness while allowing the received radiation to pass to the detector, said cold table being machined on the side nearest the detector so as to form a reflecting mirror having a substantially circular cross-section; and
  reflecting means whereby the angle of view of the detector is limited and the radiation emitted by the detector externally of the desired angle of view is reflected back to said detector, said means being constituted by a mirror formed by a reflecting deposit on one face of a transparent element interposed on the optical path for receiving infrared radiation, said reflecting deposit preventing by reflection the reception of radiation located externally of the angle of view and being formed externally of the cooling device and at least at the level of the outer face of the window, said element which carries the reflecting deposit being combined optically with said cold table so that the radiation issuing from the detector externally of the angle of view is reflected from the reflecting deposit towards said mirror to arrive thereon at a normal angle of incidence.

10. A device according to claim 9 in which the cooling device comprises a metallic cold screen which is rigidly fixed to the cold table and provided with an opening forming a diaphragm for transmission of the radiation received through the window, wherein the dimensions of the opening are so determined as to be at least equal to those required for the maximum angle of view to be contemplated for the associated detector.

11. A device according to claim 9, wherein the reflecting deposit is formed on the outer face of the window constituted by a plate having parallel faces located substantially at the focus of the mirror considered on the optical axis of the device which passes through the center of the detector.

12. A device according to claim 9, wherein the reflecting deposit is formed on the concave outer face of the window constituted by a planoconcave lens located between the center and the focus of the mirror, these points being considered on the optical axis of the device which passes through the center of curvature.

13. A device according to claim 9, wherein the reflecting deposit is formed on a convex face of an optical formula located externally of the cooling device, said optical formula beng determined to provide the image of the detector formed in the plane of said detector.

14. A device according to claim 13, wherein the optical formula is reduced to the window whose outer face is machined so as to be convex and carries the reflecting deposit, the detector being substantially placed at the corresponding center of curvature.

15. A device according to any one of claims 9, 10 or 13, and employed in conjunction with an objective which receives the infrared radiation emanating from the observed field and which focuses said radiation onto the detector, wherein the receiving objective is of a central occultation type and wherein the reflecting deposit comprises a complementary reflecting deposit formed within the angle of view and limited to the occultation zone at the level of the face which supports said reflecting deposit.

* * * * *